(12) United States Patent
Montboeuf et al.

(10) Patent No.: US 11,833,872 B2
(45) Date of Patent: Dec. 5, 2023

(54) SUSPENSION THRUST BEARING DEVICE WITH DUST BOOT RETAINER

(71) Applicant: Aktiebolaget SKF, Gothenburg (SE)

(72) Inventors: Bruno Montboeuf, Saint-Cyr-sur-Loire (FR); Jordan Renaudon, Tours (FR)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 17/367,475

(22) Filed: Jul. 5, 2021

(65) Prior Publication Data
US 2022/0024273 A1     Jan. 27, 2022

(30) Foreign Application Priority Data
Jul. 21, 2020 (KR) .................. 10-2020-0090180

(51) Int. Cl.
*B60G 15/06*     (2006.01)
*F16C 19/10*     (2006.01)
*F16C 33/76*     (2006.01)
*F16F 9/38*     (2006.01)
(Continued)

(52) U.S. Cl.
CPC ......... *B60G 15/068* (2013.01); *B60G 15/063* (2013.01); *F16C 1/10* (2013.01); *F16C 33/761* (2013.01); *F16F 9/38* (2013.01); *B60G 2204/128* (2013.01); *B60G 2204/418* (2013.01); *F16C 2326/05* (2013.01)

(58) Field of Classification Search
CPC ............... B60G 15/068; B60G 15/063; B60G 2204/129; B60G 2204/418; F16C 19/10; F16C 33/761; F16C 2326/05; F16C 27/08; F16F 9/38
See application file for complete search history.

(56) References Cited

U.S. PATENT DOCUMENTS 9,440,505 B2    9/2016   Tsunekawa et al.
2008/0031562 A1*   2/2008   Poulle .................. B60G 11/15
                                                 384/618
(Continued)

FOREIGN PATENT DOCUMENTS

CN         111059144 B *   3/2023        B60G 13/003
DE      102017210728 A1    12/2018
(Continued)

OTHER PUBLICATIONS

Description Translation for KR 2018/0008927 from Espacenet (Year: 2018).*

*Primary Examiner* — Jason D Shanske
*Assistant Examiner* — Daniel M. Keck
(74) *Attorney, Agent, or Firm* — GARCIA-ZAMOR INTELLECTUAL PROPERTY LAW, LLC; Ruy Garcia-Zamor

(57) ABSTRACT

A suspension thrust bearing device provides a lower support cap, an upper bearing cap and at least one bearing arranged between the caps. The lower support cap includes a rigid main body in contact with the bearing, and a flexible vibration damping seat delimiting a bearing surface for the upper end of a suspension ring. The vibration damping seat of the lower support cap is secured to the main body and is provided with at least one retaining hook extending at least in the radial direction and axially offset with respect to the bearing surface on the side opposite to the bearing.

15 Claims, 4 Drawing Sheets

(51) Int. Cl.
    *F16C 27/08*     (2006.01)
    *F16C 1/10*     (2006.01)

(56) References Cited

U.S. PATENT DOCUMENTS

| | | | |
|---|---|---|---|
| 2012/0321238 A1* | 12/2012 | Corbett | F16C 27/08 384/590 |
| 2013/0195393 A1* | 8/2013 | Corbett | B60G 15/068 384/622 |
| 2020/0189344 A1 | 6/2020 | De Lemps et al. | |
| 2021/0010538 A1* | 1/2021 | Chambonneau | B60G 15/063 |

FOREIGN PATENT DOCUMENTS

| | | | | |
|---|---|---|---|---|
| EP | 1591691 A1 | | 11/2005 | |
| FR | 2948066 A1 | * | 1/2011 | ........... B60G 15/068 |
| FR | 3125462 A1 | * | 1/2023 | |
| FR | 3125498 A1 | * | 1/2023 | |
| JP | 2005265154 A | | 9/2005 | |
| KR | 20180008927 A | * | 1/2018 | |
| WO | WO-2012028177 A1 | * | 3/2012 | ........... B60G 15/067 |

* cited by examiner

SUSPENSION THRUST BEARING DEVICE WITH DUST BOOT RETAINER

CROSS-REFERENCE TO RELATED APPLICATIONS

This application claims priority to South Korea Patent Application no. 10-2020-0090180, filed Jul. 21, 2020, the contents of which is fully incorporated herein by reference.

TECHNICAL FIELD OF THE INVENTION

The present invention relates to the field of suspension thrust bearing devices, used in particular for motor vehicles in the suspension struts of the steered road wheels.

BACKGROUND OF THE INVENTION

A suspension thrust bearing device is generally provided with a rolling bearing comprising an upper ring and a lower ring between which are positioned rolling elements, for example balls or rollers, and with lower and upper caps. The lower and upper caps form housings for the rings of the rolling bearing and provide the interface between the rings and the neighboring elements.

The suspension thrust bearing device is arranged in the top part of the suspension strut between the vehicle body and a suspension spring. The suspension spring is mounted around a damping piston rod, the end of which is connected to the vehicle body. The suspension spring axially bears on the lower cap of the thrust bearing device.

The suspension thrust bearing device allows transmission of axial and radial forces between the suspension spring and the vehicle body, while allowing a relative rotational movement between the lower cap and the upper cap resulting from a deflection of the steered wheels of the vehicle and/or compression of the suspension spring.

Otherwise, in order to prevent dust from being attached to the damping piston rod or to the rolling bearing of the suspension thrust bearing device, a dust cover or boot is radially provided between the piston rod and the suspension spring. The dust cover is elastically deformable and is in a shape of bellows tube.

Generally, the dust boot is secured to the rigid lower cap of the suspension thrust bearing device. An insulator may also be additionally interposed between the upper end of the suspension spring and the lower cap. For more details, it is possible for example to refer to the patent U.S. Pat. No. 9,440,505.

Such suspension thrust bearing device has the major drawback to require a large number of operations to be mounted around the damping piston rod.

One aim of the present invention is to overcome this drawback.

SUMMARY OF THE INVENTION

The invention relates to a suspension thrust bearing device comprising a lower support cap, an upper bearing cap and at least one bearing arranged between the caps.

The lower support cap comprises a rigid main body in contact with the bearing, and a flexible vibration damping seat delimiting a bearing surface for the upper end of a suspension ring.

According to a first general feature, the vibration damping seat is secured to the main body.

According to a second general feature, the vibration damping seat is provided with at least one retaining hook extending at least in the radial direction and axially offset with respect to the bearing surface on the side opposite to the bearing.

The vibration damping seat is integrated to the rigid main body. No additional component to mount is needed to damp the vibrations of the suspension spring. Besides, the retaining hook(s) of the vibration damping seat enable to axially retain the dust boot.

Preferably, the main body of the lower support cap is made of rigid material and the vibration damping seat is made of flexible material.

In one embodiment, the vibration damping seat of the lower support cap is provided with a radial portion coming into contact against the main body and delimiting the bearing surface, and with an axial portion coming into contact against the main body and provided with the retaining hook.

The retaining hook(s) lead to a better bonding feature between the flexible material of the vibration damping seat and the rigid material of the main body. As a matter of fact, with such retaining hook(s), the axial length of the axial portion is increased thus leading to more contact surface between the main body and this axial portion.

The axial portion of the vibration damping seat may radially cover at least partly an axial skirt of the main body.

The retaining hook of the vibration damping seat may extend a free end of the axial portion of the vibration damping seat.

In one embodiment, the retaining hook of the vibration damping seat of the lower support cap extends outwards. The retaining hook may extend radially outwards from the axial portion of the vibration damping seat.

The retaining hook may be flush or radially offset inwards with respect to the outer surface of a centering part of the axial portion for the centering of the suspension spring. To this end, the axial portion of the vibration damping seat may be provided with a part having a reduced radial thickness, this part being provided with the retaining hook. Alternatively or in combination, the axial portion of the vibration damping seat may comprise an oblique part from which extends a part provided with the retaining hook.

Accordingly, the outer retaining hook does not interfere with the suspension spring.

In another embodiment, the retaining hook may extend inwards. In this case, the retaining hook may project inwards with regard to the bore of the axial portion of the main body of the lower support cap. The retaining hook may comprise a radial heel recovering the free end of the axial portion of the main body of the lower support cap. The bonding between the vibration damping seat and the main body is further increased.

In one embodiment, the vibration damping seat of the lower support cap may be overmoulded onto the main body.

The invention also relates to a strut bearing unit comprising a rod, a suspension spring mounted around the rod, a suspension thrust bearing device as previously defined, and a dust boot mounted around the rod. The dust cover is axially secured to the suspension thrust bearing device by cooperation with the retaining hook of the vibration damping seat of the lower support cap.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
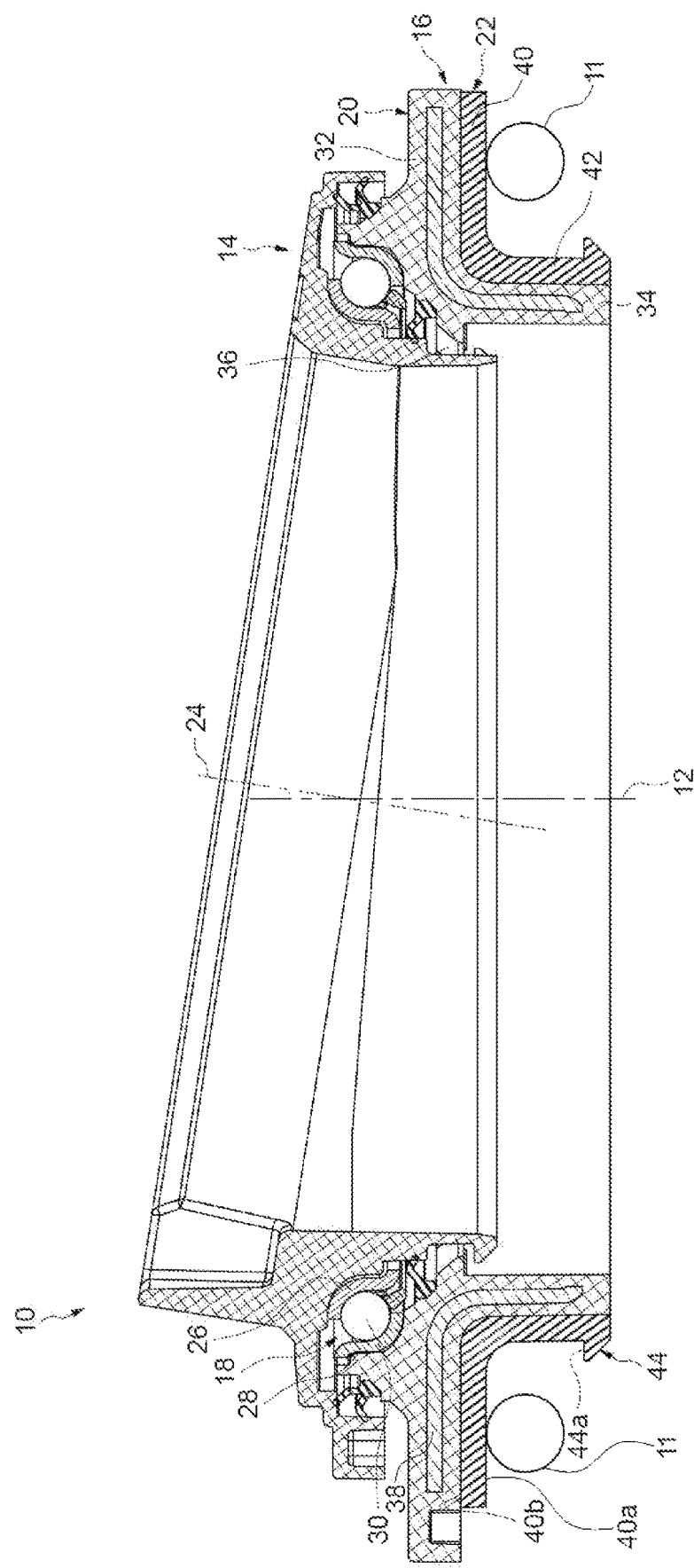
FIG. 1 is a cross-section of a suspension thrust bearing device according to a first example of the invention.

The suspension thrust bearing device 10 represented on FIG. 1 is adapted to be installed between a top retainer seat suitable of resting, directly or indirectly, in an element of a chassis of the motor vehicle, and a suspension spring 11.

The device 10, with an axis 12, comprises an upper bearing cap 14, a lower support cap 16, and a rolling bearing 18 axially interposed between the caps 14, 16. In the illustrated example, the caps 14, 16 are mounted in direct contact with the rolling bearing 18 without the interposition of an intermediate element. Alternatively, the caps 14, 16 may be mounted in indirect contact with the rolling bearing 18 with interposition of an intermediate element.

As will be described later, the lower support cap 16 comprises a rigid main body 20 in contact with the rolling bearing 18, and a flexible insulator or vibration damping seat 22 secured to the main body. The vibration damping seat 22 delimits a bearing surface for the suspension spring 11 and enables to axially retain a dust boot or cover (not shown).

The upper bearing cap 14 may consist in one part, for example from rigid plastic material, such as polyamide PA 6.6 which may or may not be reinforced with glass fibers. In the disclosed example, the axis 24 of the upper bearing cap 14 is tilted with respect to the axis 12 of the device. Alternatively, the axis 24 may be coaxial to the axis 12.

The rolling bearing 18 comprises an upper ring 26 in contact with the upper bearing cap 14, a lower ring 28 in contact with the lower support cap 16, and one row of rolling elements 30, here balls, arranged between raceways formed on the rings. In the illustrated example, the rolling bearing 18 is of the oblique contact type to absorb both the radial forces and the axial forces exerted on the device. The rolling bearing 18 also comprises a cage (not referenced) between the upper and lower rings 26, 28 so as to maintain a regular circumferential spacing between the rolling elements 24.

The lower ring 28 of the rolling bearing is in contact with an upper surface of the main body 20 of the lower support cap.

The main body 20 may be made in one part. The main body 20 is made from rigid plastic material, for example such as polyamide PA 6.6 which may or may not be reinforced with glass fibers.

The main body 20 of the lower support cap 16 comprises an annular radial portion 32 in the form of a plate, and an annular axial skirt 34 which extends a small-diameter edge of the radial portion 32. The skirt 34 extends axially on the side opposite to the upper bearing cap 14 and the rolling bearing 18. The lower ring 28 of the rolling bearing is in contact with the upper surface of the radial portion 32.

In the illustrated example, the lower support cap 16 also comprises a plurality of inner hooks 36 arranged on the radial portion 32 and extending radially inwards. The hooks 36 extend from the bore of the radial portion 32 radially inward in the direction of the upper bearing cap 14. The hooks 36 are spaced apart from each other in the circumferential direction, preferably regularly. Alternatively, the lower support cap 16 may comprise one annular inner hook, i.e. which is continuous in the circumferential direction. The hooks 36 are disposed axially above hooks (not referenced) of the upper bearing cap 14 and designed as to be able to interfere diametrically with the hooks in the case of relative axial displacement of the bearing cap 14 and the support cap 16.

In the illustrated example, the lower support cap 16 is provided with a reinforcing insert 38 embedded into the main body 20. The reinforcing insert 38 may be made from plastic material or metal. Alternatively, the lower support cap 16 may be deprived of such reinforcing insert 38.

As previously mentioned, the vibration damping seat 22 of the lower support cap is secured to the main body 20. The vibration damping seat 22 may be overmolded onto the main body 20.

Alternatively, the vibration damping seat 22 may be bonded to the vibration damping seat 22 by any other appropriate means, for example by gluing. The vibration damping seat 22 is made of flexible material, for example like natural or synthetic rubber, or polyurethane or thermoplastic elastomer (TPE). The vibration damping seat 22 is made in one part.

The vibration damping seat 22 comprises an annular radial portion 40 and an annular axial skirt or portion 42. The radial portion 40 axially comes into contact against the radial portion 32 of the main body. The radial portion 40 is provided with a lower radial bearing surface 40a for the suspension spring 11. In the illustrated example, the bearing surface 40a has an annular form. The bearing surface 40a is oriented axially downwards, i.e. axially on the side opposite to the radial portion 32 of the main body. The radial portion 40 is also provided with an upper radial surface 40b in axial contact with the radial portion 32 of the main body. The radial surfaces 40a, 40b delimits the axial thickness of the radial portion 40.

The axial portion 42 comes into radial contact against the axial skirt 34 of the main body. The axial portion 42 radially surrounds the axial skirt 34. In the illustrated example, the free lower end of the axial portion 42 of the vibration damping seat is flush with the free lower end of the axial skirt 34 of the main body. The axial portion 42 of the vibration damping seat extends the radial portion 40. The axial portion 42 extends a small-diameter edge of the radial portion 40. The axial portion 42 extends axially on the side opposite to the upper bearing cap 14 and the rolling bearing 18. In the illustrated example, the outer surface of the axial portion 42 has a single diameter.

As previously mentioned, the vibration damping seat 22 of the lower support cap enables to axially retain the dust boot of the associated strut bearing unit.

To this end, the vibration damping seat 22 is provided with an annular protrusion or hook 44 extending radially outwards. The axial portion 42 of the vibration damping seat comprises the hook 44. The hook 44 extends from the axial portion 42. The hook 44 extends from the outer surface of the axial portion 42. The hook 44 projects outwards with regard to the outer surface of the axial portion 42. In the illustrated example, the hook 44 is axially located at the lower end of the axial portion 42. Alternatively, the hook 44 may be axially offset with respect to the lower end of the axial portion 42.

The hook 44 is provided with an upper radial abutment surface 44a oriented axially upwards, i.e. axially oriented towards the bearing surface 40a of the radial portion of the vibration damping seat.

The hook 44 is designed to diametrically interfere with the dust boot. The hook 44 interferes with a retaining part of the dust boot, for example an annular clip or a plurality of spaced clips.

The hook 44 of the vibration damping seat may have an outer diameter greater than the inner diameter of the retaining part of the dust boot so that the abutment surface 44a is be able to interfere diametrically with this retaining part in the case of relative axial displacement of the dust boot and the lower support cap 16.

In the illustrated example, the inner diameter of the suspension spring 11 is substantially larger than the outer diameter of the axial portion 42 and the outer diameter of the hook 44. Accordingly, there is no interference between the hook 44 of the vibration damping seat 22 and the suspension spring 11.

Figure 2:
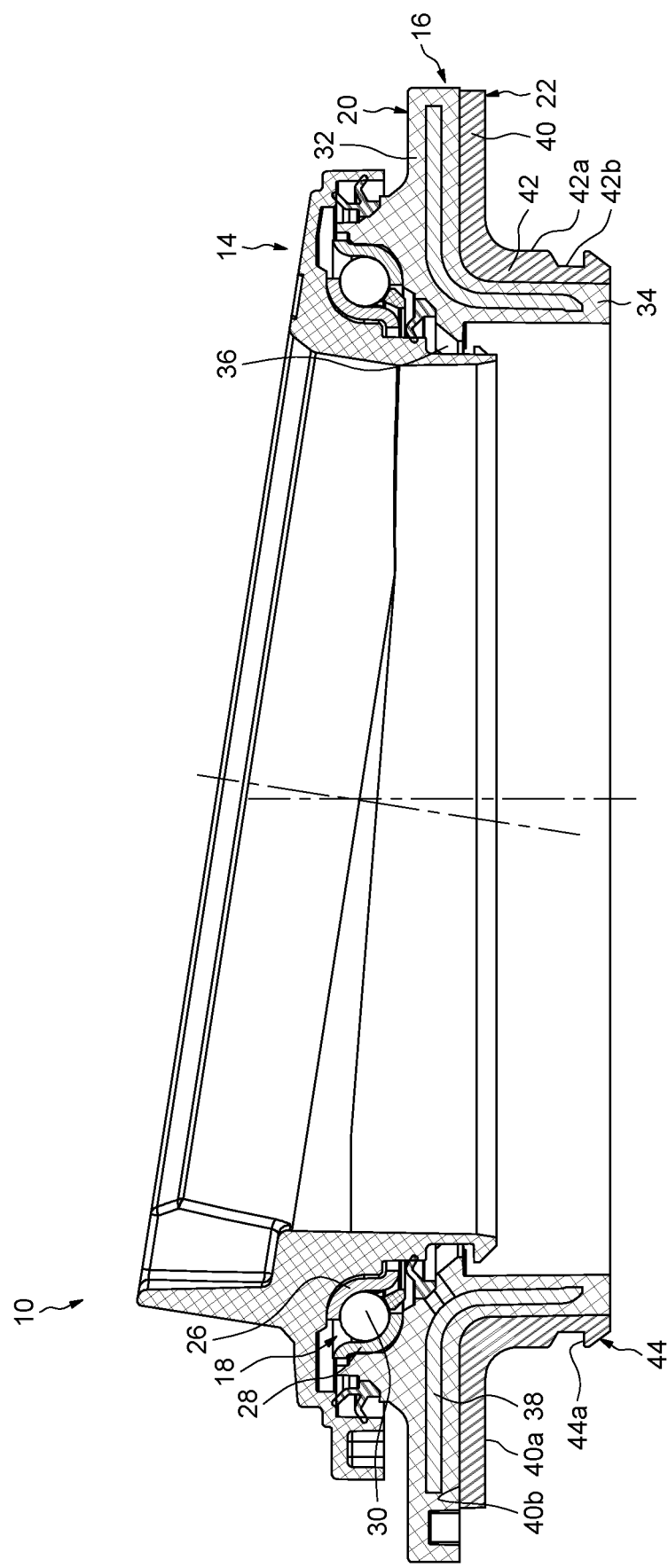
FIG. 2 is a cross-section of a suspension thrust bearing device according to a second example of the invention.

The example shown on FIG. 2, in which identical parts are given identical references, only differs from the first example in that the lower end of the axial portion 42 of the vibration damping seat has a reduced radial thickness. Thus, the axial portion 42 is provided with a first part 42a and with a second part 42b having a reduced outer diameter. The second part 42b extends axially the first part 42a. The first part 42a extends axially the radial portion 40.

In this example, the hook 44 extends from the second part 42b of the axial portion 42 of the vibration damping seat. The hook 44 extends from the outer surface of the second part 42b. Here, the hook 44 is flush with the outer surface of the first part 42a. Alternatively, the hook 44 may be radially offset inwards with respect to the outer surface of the first part 42a.

The first part 42a of the axial portion 42 of the vibration damping seat allows centering of the suspension spring. This centering is achieved by the outer surface of the first part 42a. In this case, the inner diameter of the suspension spring is substantially equal to the outer diameter of the first part 42a of the axial portion 42 of the vibration damping seat.

Figure 3:
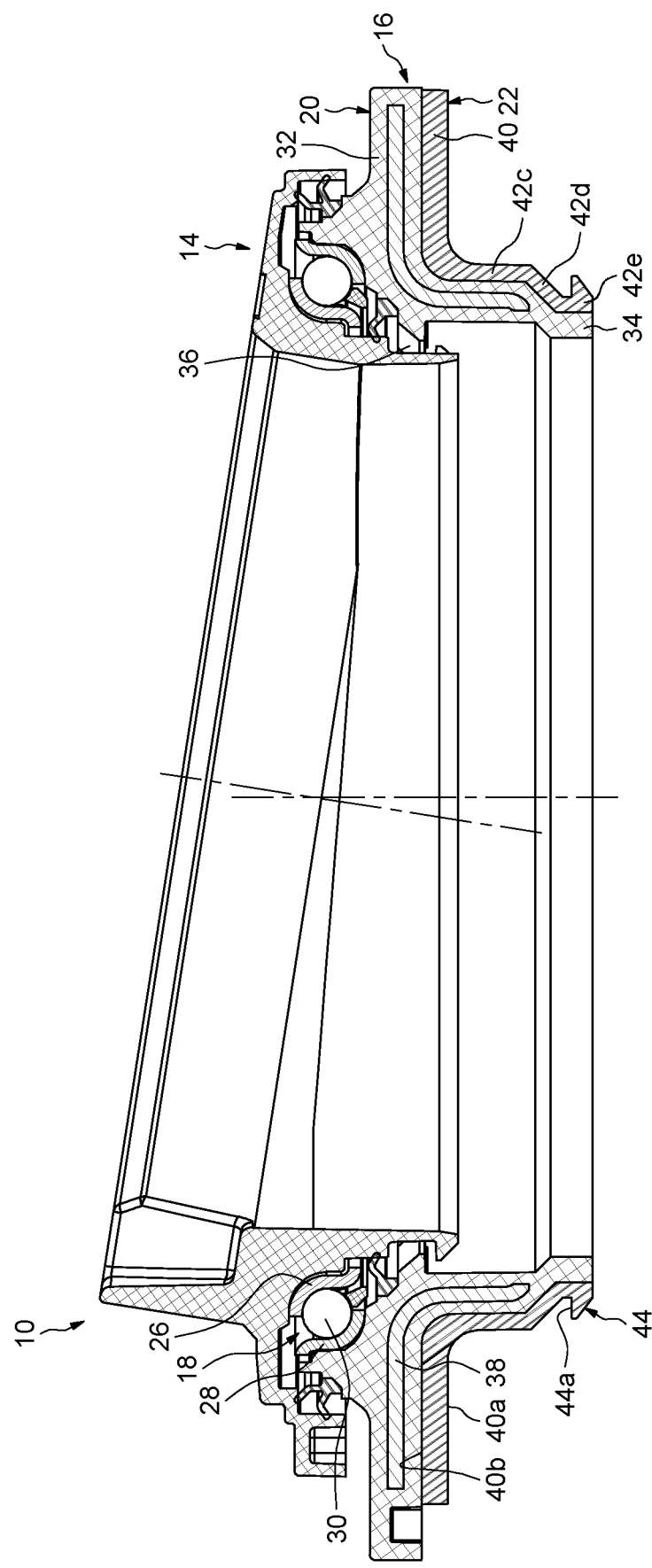
FIGS. 3 and 4 are cross-sections of suspension thrust bearing devices according to third and fourth examples of the invention.

In these two previous illustrated examples, both the axial portion 42 of the vibration damping seat and the axial skirt 34 of the main body extend purely axially. Alternatively, the axial portion 42 and skirt 34 may have a stepped shape as illustrated in the example shown on FIG. 3, in which identical parts are given identical references.

In this example, the axial portion 42 of the vibration damping seat is provided with a first axial part 42c extending the radial portion 40, with a frustoconical part 42d extending obliquely inwards the first axial part 42c, and with a second axial part 42e extending the frustoconical part 42d axially on the side opposite to the first axial part 42c. The frustoconical part 42d is axially disposed between the first and second axial parts 42c, 42e. here, the thickness of the axial portion 42 is constant.

The hook 44 extends from the second axial part 42e of the axial portion 42 of the vibration damping seat. The hook 44 extends from the outer surface of the second axial part 42e. Here, the hook 44 is radially offset inwards with respect to the outer surface of the first axial part 42c. Alternatively, the hook 44 may be flush with the outer surface of the first axial part 42c. The first axial part 42c of the axial portion 42 of the vibration damping seat allows centering of the suspension spring.

Figure 4:
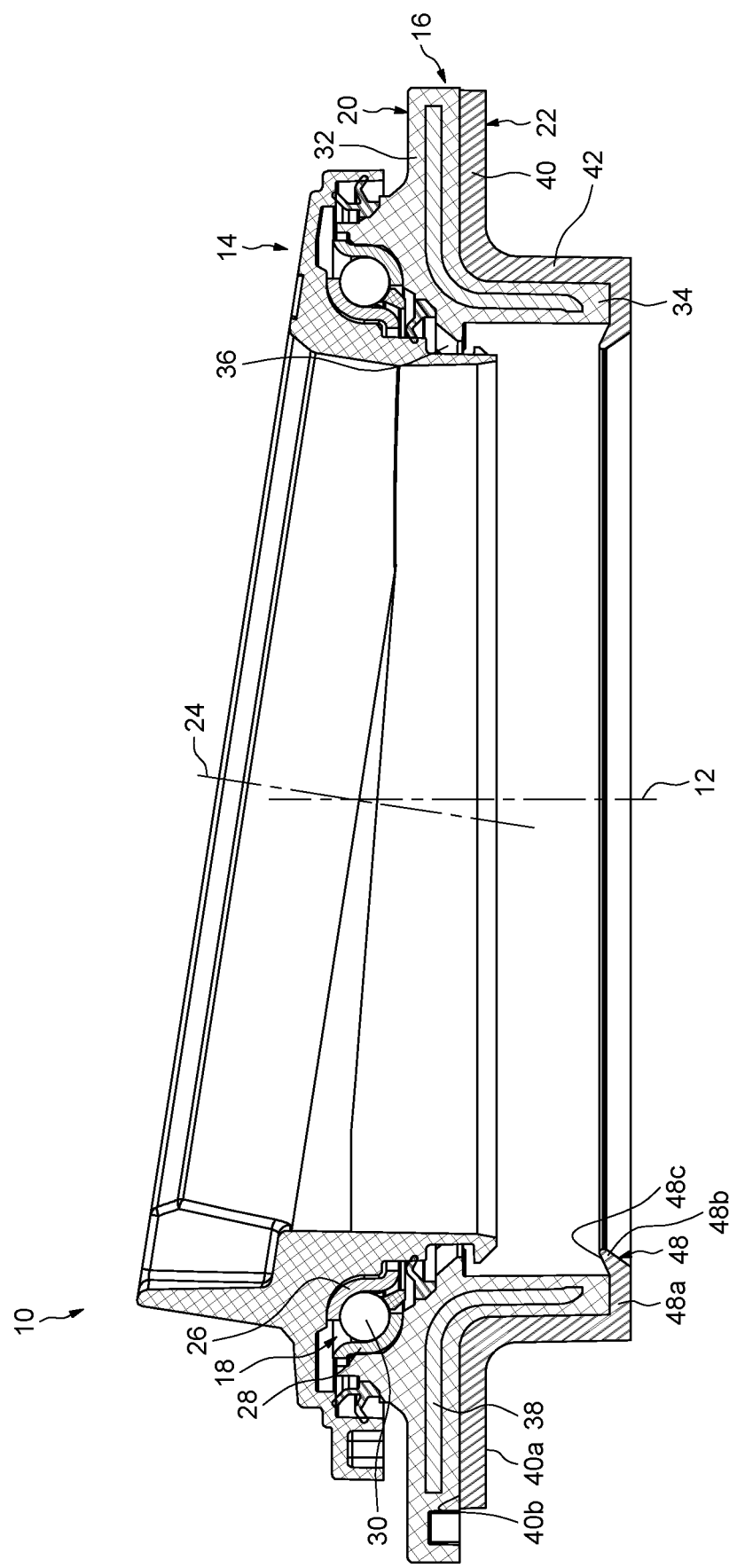

The example shown on FIG. 4, in which identical parts are given identical references, differs from the first example in that the vibration damping seat 22 is provided with an annular protrusion or hook 48 extending radially inwards. The axial portion 42 of the vibration damping seat comprises the hook 48. The hook 48 extends from the axial portion 42.

The hook 48 projects inwards with regard to the bore of the axial portion 40 of the main body. In this example, the hook 48 extends inwards the lower end of the axial portion 42.

In this example, the hook 48 comprises a heel 48a extending radially inwards from the axial portion 42 and from which is issued an annular rib 48b extending obliquely inwards.

The heel 48a extends radially inwards the axial portion 42 of the vibration damping seat. The heel 48a extends radially from the bore of the axial portion 42. The heel 48a recovers the free end of the axial portion 34 of the main body.

The annular rib 48b extends from the bore of the heel 48a. The rib 48b extends both radially inwards and axially upwards. The heel 48a projects inwards with regard to the bore of the axial portion 40 of the main body.

The rib 48b of the hook is provided with an upper abutment surface 48c oriented axially upwards, i.e. axially oriented towards the upper bearing cap 14.

The hook 48b is designed to diametrically interfere with the dust boot. The hook 48b interferes with a retaining part of the dust boot, for example an annular clip or a plurality of spaced clips.

The hook 48b of the vibration damping seat may have an inner diameter smaller than the outer diameter of the retaining part of the dust boot so that the abutment surface 48c is be able to interfere diametrically with this retaining part in the case of relative axial displacement of the dust boot and the lower support cap 16.

In the illustrated examples, the vibration damping seat 22 of the lower support cap is provided with an annular hook 44, 48. Alternatively, the vibration damping seat 22 of the lower support cap may be provided with a plurality of hooks spaced apart from each other in the circumferential direction, preferably regularly.

In the described examples, the hook(s) of the vibration damping seat 22 are provided to interfere by clipping with the associated dust boot. Alternatively, instead of clipping, the hook(s) of the vibration damping seat may cooperate with the dust boot by radial friction contact.

In the illustrated examples, the thrust bearing device comprises an angular contact rolling bearing provided with one row of balls. The thrust bearing device may comprise other types of rolling bearing, for example bearings having four points contacts and/or with at least double rows of balls. The rolling bearing of the device may comprise other types of rolling elements, for example rollers. In another variant, the bearing of the device may also be a sliding bearing having no rolling elements, and provided with two rings or only with one ring.

The invention claimed is:

1. A suspension thrust bearing device comprising:
a lower support cap having a rigid main body, the rigid main body containing a reinforcing insert,
an upper bearing cap,
at least one bearing arranged between the upper bearing cap and the lower support cap, the at least one bearing having a lower race, the rigid main body being in direct contact with the lower race of the at least one bearing, and
a flexible vibration damping seat of the lower support cap delimiting a bearing surface for the upper end of a suspension spring, wherein the flexible vibration damping seat
is secured to the rigid main body, the flexible vibration damping seat having an axially extending annular skirt which when viewed in cross-section has at least one retaining hook extending radially outwardly therefrom and which is axially offset with respect to the bearing surface on a side opposite to the at least one bearing, wherein the reinforcing insert has an axially extending portion and a radially extending portion, when viewed in cross-section the reinforcing insert is fully enclosed within the rigid main body, and wherein the at least one retaining hook of the flexible vibration damping seat does not radially overlap the axially extending portion of the reinforcing insert.

2. The device according to claim 1, wherein the rigid main body of the lower support cap is made of rigid material and the flexible vibration damping seat is made of flexible material, relative to the rigid main body.

3. The device according to claim 1, wherein the flexible vibration damping seat of the lower support cap is provided with a radial portion coming into contact against the rigid main body and delimiting the bearing surface, and with an axial portion coming into contact against the rigid main body and provided with the at least one retaining hook.

4. The device according to claim 3, wherein the axial portion of the vibration damping seat of the lower support cap radially covers at least partly an axial skirt of the rigid main body.

5. The device according to claim 3, wherein the at least one retaining hook of the vibration damping seat of the lower support cap extends from a free end of the axial portion.

6. The device according to claim 3, wherein the retaining hook being flush or radially offset inwards with respect to an axially outer surface of a centering part of the axial portion for the centering of the suspension spring.

7. The device according to claim 1, wherein the flexible vibration damping seat of the lower support cap is overmoulded onto the main body.

8. The device according to claim 1, wherein the at least one retaining hook is configured to engage a dust boot.

9. A suspension thrust bearing device comprising:
a lower support cap having a rigid main body, the rigid main body containing a reinforcing insert,
an upper bearing cap,
at least one bearing arranged between the upper bearing cap and the lower support cap, the at least one bearing having a lower race, the rigid main body being in direct contact with the lower race of the at least one bearing, and
a flexible vibration damping seat of the lower support cap delimiting a bearing surface for the upper end of a suspension spring, wherein the flexible vibration damping seat
is secured to the rigid main body, the flexible vibration damping seat having an axially extending annular skirt which when viewed in cross-section has at least one retaining hook extending radially inwardly therefrom which forms an axial end of the suspension thrust bearing device and which is axially offset with respect to the bearing surface on a side opposite to the at least one bearing,
wherein the reinforcing insert has an axially extending portion and a radially extending portion, when viewed in cross-section the reinforcing insert is fully enclosed within the rigid main body, and
wherein the at least one retaining hook of the flexible vibration damping seat of the lower support cap projects radially inwards past an axially extending portion of the rigid main body of the lower support cap;

wherein the at least one retaining hook of the flexible vibration damping seat of the lower support cap comprises a radial heel which is seated at a free end of the axially extending portion of the rigid main body of the lower support cap; and wherein the annular skirt has a lower-most end and the radial heel extends obliquely inward to an axial location between the lower-most end of the annular skirt and a radial portion of the vibration dampening seat.

10. The device according to claim 9, wherein the at least one retaining hook of the flexible vibration damping seat of the lower support cap contacts the lower-most end of the annular skirt.

11. A suspension thrust bearing device, having a device axis, the suspension thrust bearing device comprising:
a lower support cap having a rigid main body, the rigid main body containing a reinforcing insert,
an upper bearing cap having an upper bearing cap axis, the upper bearing cap axis being askew from the device axis,
at least one bearing arranged between the upper bearing cap and the lower support cap, the at least one bearing having a lower race, the rigid main body being in direct contact with the lower race of the at least one bearing, and
a flexible vibration damping seat of the lower support cap delimiting a bearing surface for the upper end of a suspension spring, wherein the flexible vibration damping seat
is secured to the rigid main body, the flexible vibration damping seat having an axially extending annular skirt which when viewed in cross-section has at least one retaining hook extending radially outwardly therefrom and which is axially offset with respect to the bearing surface on a side opposite to the at least one bearing,
wherein the reinforcing insert has an axially extending portion and a radially extending portion, when viewed in cross-section the reinforcing insert is fully enclosed within the rigid main body, and
wherein the at least one retaining hook of the flexible vibration damping seat does not radially overlap the axially extending portion of the reinforcing insert.

12. The device according to claim 11, wherein the flexible vibration damping seat of the lower support cap is provided with a radial portion coming into contact against the rigid main body and delimiting the bearing surface, and with an axial portion coming into contact against the rigid main body and provided with the at least one retaining hook.

13. The device according to claim 12, wherein the axial portion of the flexible vibration damping seat of the lower support cap radially covers at least partly an axial skirt of the main body.

14. The device according to claim 12, wherein the at least one retaining hook of the flexible vibration damping seat of the lower support cap extends from a free end of the axial portion.

15. The device according to claim 12, wherein the at least one retaining hook being flush or radially offset inwards with respect to an axially outer surface of a centering part of the axial portion for the centering of the suspension spring.

* * * * *